(12) United States Patent
Agrawal et al.

(10) Patent No.: US 9,646,083 B2
(45) Date of Patent: May 9, 2017

(54) WEB 2.0 SYSTEM AND METHOD FOR DYNAMIC CATEGORIZATION OF HETEROGENEOUS AND REGULATED ENTERPRISE ASSETS

(75) Inventors: Geetika Agrawal, San Jose, CA (US); Benjamin Honzal, Isny im Allgaeu (DE); Jacques Joseph Labrie, Sunnyvale, CA (US); Mary Ann Roth, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/949,680

(22) Filed: Dec. 3, 2007

(65) Prior Publication Data
US 2009/0144296 A1 Jun. 4, 2009

(51) Int. Cl.
*G06F 17/30* (2006.01)
(52) U.S. Cl.
CPC .............. *G06F 17/30722* (2013.01)
(58) Field of Classification Search
None
See application file for complete search history.

(56) References Cited

U.S. PATENT DOCUMENTS

| | | | |
|---|---|---|---|
| 6,678,693 B1 * | 1/2004 | Shiraishi | G06F 17/30604 |
| 6,721,726 B1 | 4/2004 | Swaminathan et al. | |
| 2003/0120599 A1 * | 6/2003 | Agboatwalla et al. | ......... 705/50 |
| 2003/0233438 A1 | 12/2003 | Hutchinson et al. | |
| 2005/0229150 A1 | 10/2005 | Ronnewinkel | |
| 2005/0234767 A1 | 10/2005 | Bolzman et al. | |
| 2005/0234959 A1 | 10/2005 | Ronnewinkel et al. | |
| 2005/0234969 A1 * | 10/2005 | Mamou | ........... G06Q 10/10 |
| 2006/0161529 A1 | 7/2006 | Venguerow | |
| 2006/0253289 A1 | 11/2006 | Kymal et al. | |
| 2007/0011134 A1 | 1/2007 | Langseth et al. | |
| 2007/0204218 A1 | 8/2007 | Weber et al. | |
| 2007/0226218 A1 * | 9/2007 | Chatterjee | ............ G06F 9/466 |
| 2008/0189303 A1 * | 8/2008 | Bush et al. | ............. 707/100 |

OTHER PUBLICATIONS

Barsky et al., "Introducing Web 2.0: Social Networking and Social Bookmarking for Health Librarians", J. Can. Health Libr. Assoc. 2006; 27(1):pp. 65-67.

* cited by examiner

*Primary Examiner* — Mahesh Dwivedi
*Assistant Examiner* — Johnese Johnson
(74) *Attorney, Agent, or Firm* — Rabindranath Dutta; Konrad, Raynes, Davda & Victor LLP (57) ABSTRACT

A system and method for the dynamic categorization of heterogeneous, regulated enterprise information assets. In one embodiment of the invention a system includes a computer network controlled by an enterprise and a database including a plurality of enterprise data entities. A user interface, through which a plurality of enterprise users may access the enterprise data entities, is also used by the plurality of users to assign user-defined categories to the enterprise data entities. The user interface is configured to enable a plurality of the users to access and assign additional user-defined categories to enterprise data entities having user-defined categories previously assigned by other users.

24 Claims, 6 Drawing Sheets

WEB 2.0 SYSTEM AND METHOD FOR DYNAMIC CATEGORIZATION OF HETEROGENEOUS AND REGULATED ENTERPRISE ASSETS

FIELD OF INVENTION

The present invention generally relates to computer implemented information management systems, and particularly to systems and methods for applying Web 2.0 concepts to enterprise information management systems.

BACKGROUND

Web 2.0 is a term generally used to refer to the concept of a second generation of web-based communities and hosted services which aim to facilitate creativity, collaboration and sharing among users. Examples of Web 2.0 include social networking sites, blogs, wikis and collaborative tagging (also referred to as folksonomies). Consumer focused Web 2.0 sites, such as Flickr.com, Gmail.com, and Facebook.com have brought about a new level of dynamic categorization, classification, and personalization. In these websites, instead of having objects, such as email, music or images, placed into predefined categories, consumers choose words or short phrases (tags) to organize and categorize the data objects. Also, multiple tags can be applied to a data object, which then become public categories which other users can tag. As a community of users grows around a site (social networking), the amount of data available for browsing, as well as the variety of tags (and thus dimensions of classification) for the piece of data increase, making it easier to for a user to find data objects of interest.

The above-mentioned Web 2.0 sites are generally limited to managing consumer, and not enterprise, data. While the enterprise space might benefit from Web 2.0 concepts, the distinct standards and restrictions of enterprise data would hinder the direct reuse of the state of the art implementations of such technology. Unlike consumer data, enterprise data usually must be hosted internally by the enterprise and is subject to rigorous standards of privacy, security, and governance. Also, in state of the art Web 2.0 sites, the hosting site usually has absolute control over the format and type of data that may be classified, which is often restricted to one format. As a result, separate sites are normally used for blogs, images, music, etc. Enterprises, on the other hand, must simultaneously manage heterogeneous data, pulled from a variety of sources and in a variety of formats, in order to make informed business decisions relating to the data.

Another key distinction between the enterprise space and the consumer space is that, in consumer sites, users can benefit from the tags and categories created by other users, but each individual user is generally only interested in the personal use of the information. In enterprises, users need to leverage the classifications of others, and coordinate and communicate with those who have touched or expressed interest in this data. The enterprise model needs to expose the identity of individuals having interest in the information being investigated and also notify those individuals if changes are being made.

Additional requirements in the enterprise space that are not generally found in consumer Web 2.0 models, include manageability and traceability. In enterprise systems tags or user-defined categories need to be treated as objects with an object lifecycle to be managed so that the origins of user-defined categories are identified along with any changes and the source of such changes. This information can be valuable for collaboration purposes, for example to contact users that previously worked with or manipulated a user-defined category. Another difference is that enterprise data is often classified among predefined, as well as user-defined, dimensions, which often must be viewed and navigated in tandem.

Current Web 2.0 systems do not adequately meet the needs of enterprise users. Some sites enable users to define their own personalized categories for a given set of information. For example, in Gmail, a user can label any piece of mail, and define multiple categories for that mail. However, the system is restricted to the format of email, must be hosted by the Gmail site, and the categories used by a user to classify mail cannot be shared by the others involved in the given email. Other sites do allow shareable tagging, such as Flickr, where users tags can be made public, but the user is restricted to the photographic format, and the content must be hosted by the Flickr site itself. Tags, while visible to everyone, are not used as a medium of communication to identify all the parties that are interested in a certain tag.

Accordingly, there is a need for systems and methods that allow the Web 2.0 concepts of user-driven dynamic categorization, classification and personalization to be used with enterprise information assets. There is also a need for systems and methods that enable Web 2.0 concepts to operate within the enterprise requirements of privacy, security and governance.

SUMMARY OF THE INVENTION

To overcome the limitations in the prior art briefly described above, the present invention provides a method, computer program product, and system for dynamic categorization of heterogeneous, regulated enterprise information assets.

In one embodiment of the present invention a method for processing information comprises: providing a first enterprise user access to a plurality of enterprise data entities; receiving from the first enterprise user a first user-defined category associated with a first one of the plurality of enterprise data entities; storing the first user-defined category in a repository such that the first user-defined category is associated with the first enterprise data entity; providing a second enterprise user access to the first enterprise data entity and to the associated first user-defined category; receiving from the second enterprise user a second user-defined category associated with the first enterprise data entity; and storing the second user-defined category in the repository such that the second user-defined category is associated with the first enterprise data entity.

In another embodiment of the present invention, a method for assigning tags to enterprise data entities comprises: displaying a list of enterprise data entities to a first enterprise user on a display device, the enterprise data entities on the list including enterprise data entities of different formats; receiving from the first enterprise user a first tag to be associated with a first one of the enterprise entities; storing the tag in a metadata repository as metadata associated with the first enterprise entity; receiving from a second enterprise user a second tag to be associated with the first enterprise entity; storing the second tag in the metadata repository as metadata associated with the first enterprise entity; and displaying to the first enterprise user the first enterprise entity including the first and second tags associated therewith.

In a further embodiment of the present invention a method of collaborating on a project comprises: providing a group of users collaborating on a project with access to a database of data entities; receiving from the users user-defined categories associated with at least one of the data entities; storing in a repository the user-defined categories such that the at least one data entity is associated with at least one of the user-defined categories, and is associated with a user who provided the received user-defined category; and providing the group of users with access to the repository.

In an additional embodiment of the present invention a system comprises: a computer network controlled by an enterprise; a database including a plurality of enterprise data entities; a user interface through which a plurality of enterprise users access the enterprise data entities, the user interface also being used by the plurality of users to assign user-defined categories to the enterprise data entities; and the user interface configured to enable a plurality of the users to access and assign additional user-defined categories to enterprise data entities having user-defined categories previously assigned by other users.

In another embodiment of the present invention, a computer program product comprises a computer usable medium having a computer readable program, wherein the computer readable program when executed on a computer causes the computer to: provide a first enterprise user access to a plurality of enterprise data entities; receive from the first enterprise user a first user-defined category associated with a first one of the plurality of enterprise data entities; store the first user-defined category in a repository such that the first user-defined category is associated with the first enterprise data entity; provide a second enterprise user access to the first enterprise data entity and to the associated first user-defined category; receive from the second enterprise user a second user-defined category associated with the first enterprise data entity; and store the second user-defined category in the repository such that the second user-defined category is associated with the first enterprise data entity.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for the dynamic categorization of heterogeneous, regulated enterprise information assets. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems that may arise when Web 2.0 concepts are used with enterprise information assets. The system and method of the invention provides enterprise customers with tools to apply dynamic categorization and personalization of their own privately hosted site, across heterogeneous data sources and formats. Embodiments of the present invention develop a model that allows an association between any enterprise entity and any number of tagging entities. These tagging entities can be a mix of predefined ones derived from an enterprise glossary, or ones created on-the-fly by enterprise users as they manage the data. The enterprise entity is generic in that it can be of any format, derived from heterogeneous set of sources. A user model can also be associated with both the tagging and enterprise entities, which will allow people to define a user role to an entity (owner, steward, etc) as well as register interest in certain enterprise entities. This allows users of the data to quickly understand and automate communication around sets of enterprise entities. Finally a security model can also be assigned to the tagging entities in order to control who has access to various classifications of data.

The present invention has significant advantages over the state of the art in that it provides tools for dynamically categorizing and classifying usage information in the enterprise environment itself, rather than in an externally hosted site that cannot handle the enterprise data and regulations. With the present invention, the enterprise hosting the system will have full control over the data formats and objects to which the tagging can be applied. Furthermore, this data can be applied to a heterogeneous set of information, since the model creates an association that does not rely on any specific data format, but instead can be associated with any enterprise data entity. Additionally, the present invention enables users to be associated with the tags as well as the entities, allowing enterprise users to understand the people involved in a certain enterprise data entity, and use this information to work more effectively on teams. The invention can also be used to integrate with predefined business glossary definitions as well. A business glossary defines and categorizes business categories and terms in a particular domain of knowledge within the enterprise. In this way, users can navigate the same set of enterprise data entities on both the user-defined and glossary defined dimensions.

Figure 1:
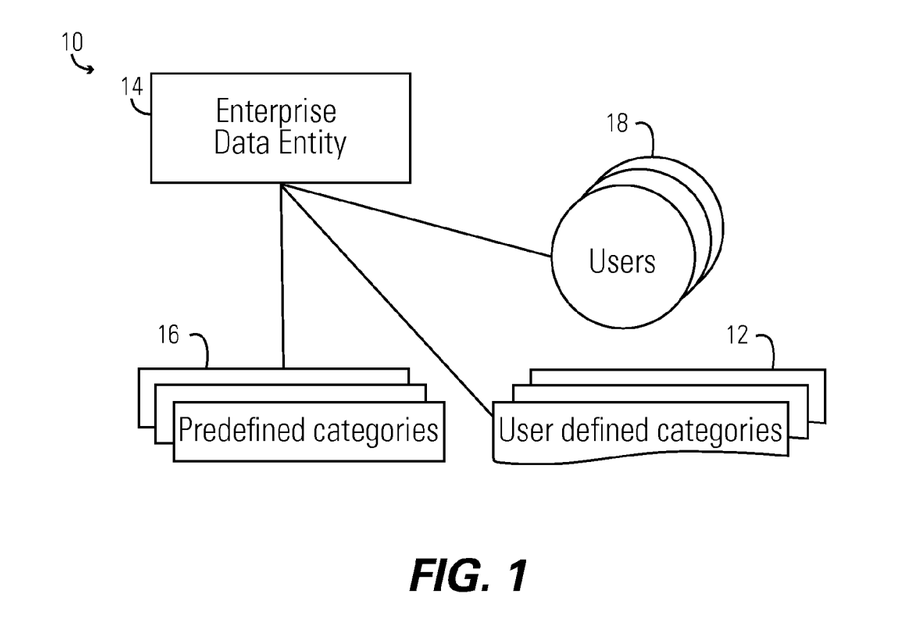
FIG. 1 shows a block diagram of a system for dynamic categorization of heterogeneous, regulated enterprise information assets in accordance with an embodiment of the invention.

FIG. 1 shows an enterprise information management system 10 in accordance with an embodiment of the invention which associates user-defined categories (UDCs) 12 to enterprise data entities (EDEs) 14. Categories may also be referred to herein as "tags". EDEs 14 can be associated with a variety of categorizing objects including predefined categories 16 (derived, for example for an enterprise class business glossary), user-defined categories 16, and tags defining users 18 associated to an entity (which can be created automatically or manually by the user). An EDE 14 can be associated to any number and combination of these categorizing objects and a categorizing object can be associated with any number of enterprise data entities.

One approach to storing and managing UDCs 12 is to view them as metadata. Thus, in some embodiments UDCs may be stored in a common metadata repository (shown in FIG. 3). We define a metadata repository as a central hub for storing and sharing metadata about EDEs 14 that are common across a set of information management tooling. In some embodiments, the metadata repository may comprise a database. Metadata is stored in a uniform format that is defined by the model of the metadata format, and any tool that understands and registers models of the matching format can store and access any of the metadata of the EDEs 14 stored in the repository. In the embodiment of the enterprise information management system 10 shown in FIG. 1, it may be assumed that a set of information management tooling, leveraged by the enterprise shop are all using the metadata repository to store and manage their information assets. Thus the set of information management tooling will understand and register metadata about their EDEs 14 in compliance with the repository format. Since a general metadata repository at the highest level treats all data entities in a heterogeneous IT system as generic data entities, this will give UDCs 12 access to the whole set of enterprise data entities, and will enable the enterprise information management system 10 to associate UDCs to a variety of different types of information—a key requirement in enterprise Information Technology (IT) systems.

Storing and managing UDCs 12 in a metadata repository also ensures that the user-defined categories are available to all applications and systems within a heterogeneous IT landscape. A metadata repository can be hosted internally or externally. In an enterprise, these repositories are generally managed internally. The result is that the enterprise will have full control over the UDCs 12 that are defined and accessed within the environment.

A UDC 12 may be represented by an object of specific type in the metadata repository. To be identifiable, the object can have required properties, such as a unique identifier, a name and a type. In addition, there can be other optional properties such as a description.

Figure 2:
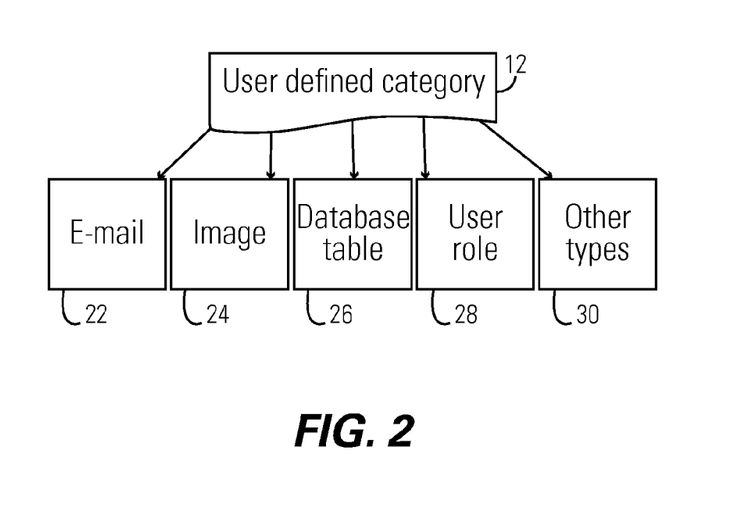
FIG. 2 shows a block diagram showing the media type independency of the system shown in FIG. 1.

As shown in FIG. 2, a UDC 12 can be associated with all other objects in the metadata repository, regardless of type. For example, the other objects may include email 22, images 24, database tables 26, user roles 28 and other types of objects 30. This means that there are no restrictions on which types of objects can be categorized; however, access restrictions can be enforced through a security and a user model. The association between the UDC 12 and any other EDE 14 in the metadata repository is defined as an n-n (many-to-many) relationship because one UDC 12 can be associated with many EDEs 14 and one EDE 14 can be categorized by many UDCs 12.

Another useful aspect of the present invention is the manageability/traceability of UDCs 12. The creation, usage, manipulation and removal of UDCs 12 can be controlled and traced. If a user removes the association between an UDC 12 and an EDE 14, this action can be traced back and possibly restored.

The user-defined categorization does not need to interfere with any predefined categories that exist in the metadata repository but instead can be seen as an addition. In addition, users are able to add their own categorization of the data to the metadata repository and share it with other users. This user-driven approach may be supported by a security model to ensure that access to the UDCs 12 can be restricted to certain users or groups of users. The security model of the metadata repository can be leveraged or extended for these purposes.

A user-model which usually is part of the metadata repository, allows associating users, groups of users, roles, or groups of roles with any entity in the repository, including predefined or user-defined categories. This means that the user can create tags which, for example, only the co-workers in their department have access to.

Figure 3:
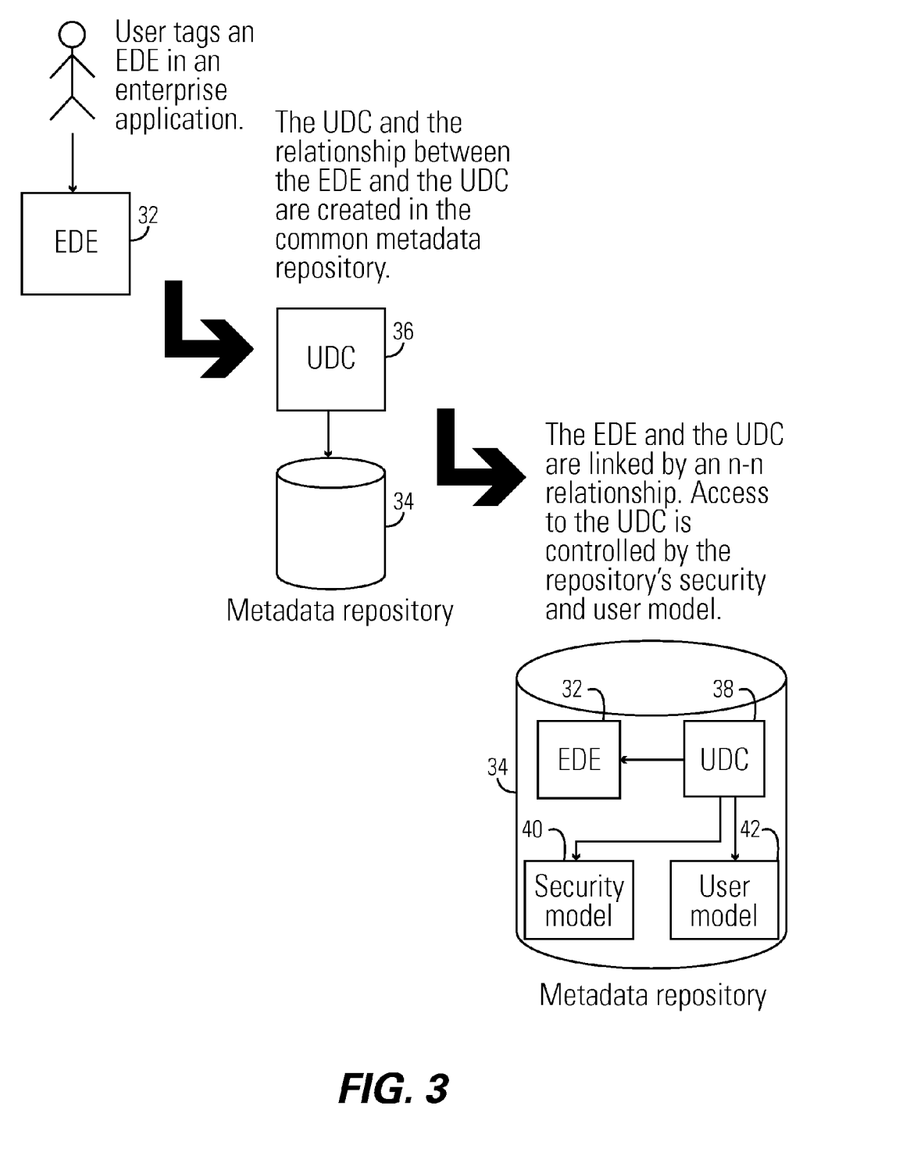
FIG. 3 shows a conceptual flow diagram of a tagging process in accordance with an embodiment of the system shown in FIG. 1.

Referring now to FIG. 3, a conceptual flow diagram of a example tagging process in accordance with an embodiment of the invention is shown. A user tags an EDE 32 in one of his enterprise applications, for example a web-based console, with a certain name. This name will then be stored together with the other required properties (a unique identifier and a type) in the metadata repository 34 as a UDC 36. If the UDC 36 already existed in the metadata repository 34, this step will be skipped and instead the existing UDC will be used. As a next step, a relationship will be created between the UDC 36 and the EDE 32, creating a new object, UDC 38. This relationship can be navigated bi-directionally, which means that 1) UDCs 38 can be found for a given EDE 32; and 2) EDEs 32 can be found for a given UDC 38. A conventional underlying security model 40 and user model 42 residing in the metadata repository 34 control access to this relationship and to the objects themselves.

Figure 4A:
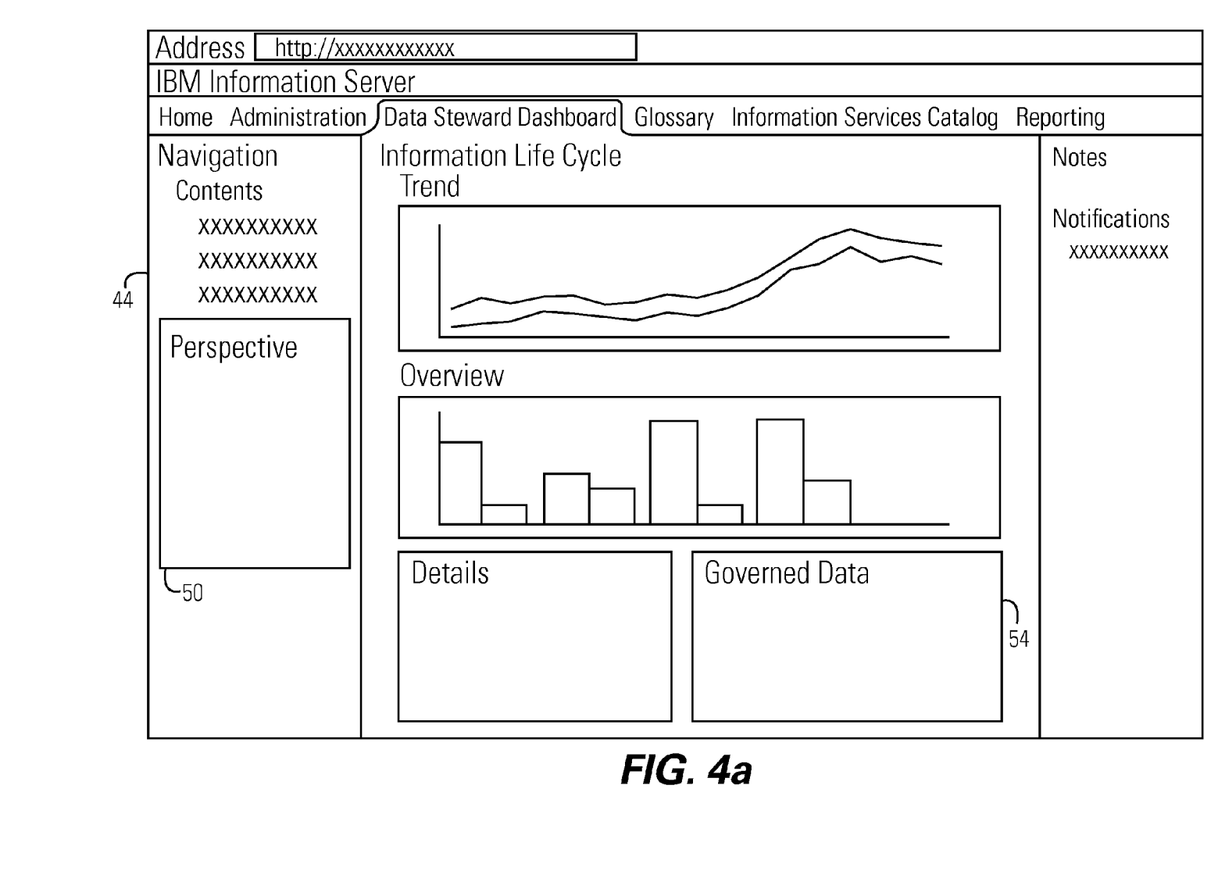
FIG. 4*a* shows an example screen display of an embodiment of the system shown in FIG. 1.
Figure 4B:
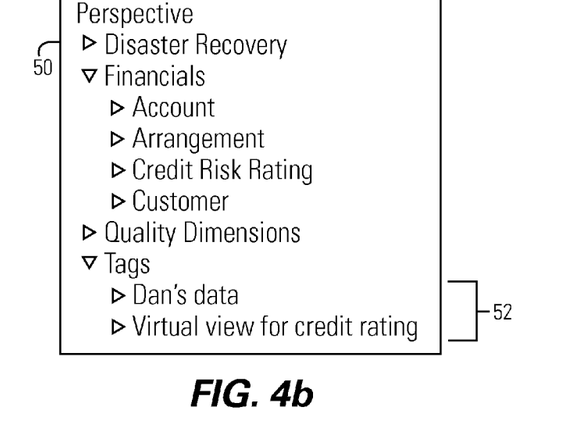
FIG. 4*b* shows a portion of the screen display shown in FIG. 4*a*.
Figure 4C:
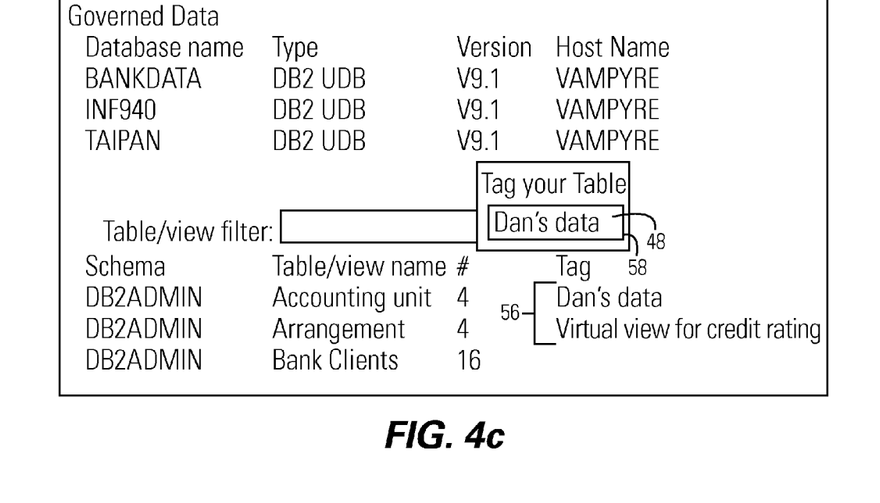
FIG. 4*c* shown a portion of the screen display shown in FIG. 4*a*.

Referring now to FIGS. 4a-4c, there is shown an example of a screen display 44 of an enterprise information management system incorporating the teachings of the present invention. In some embodiments the present invention may be implemented on an IBM Information Server 8.0. As shown in FIGS. 4a-4c, the user is presented a list of tables 46 that are cataloged in the metadata repository 34 (shown in FIG. 3) of the IBM Information Server. As used herein, a table 46 represents an EDE 32. The user can tag a table with a title which leads to the creation of a UDC 48. In this example, the UDC 48 consists of the tag "Dan's data". This UDC 48 is stored in the metadata repository 34 and links to the EDE 32. Leveraging this relationship, a custom navigation view 50 can be created, as seen in FIG. 4b. This custom navigation view 50 contains UDCs 52 that were previously created by the user through tagging. Hence, the user can navigate the EDEs 32 by his own view of the data. This view can be shared with other users of the system as well. FIG. 4c shows a tagging process view 54 that enables a user to select a table from a list of tables 56 and a window 58 for entering a UDC 48.

Figure 5:
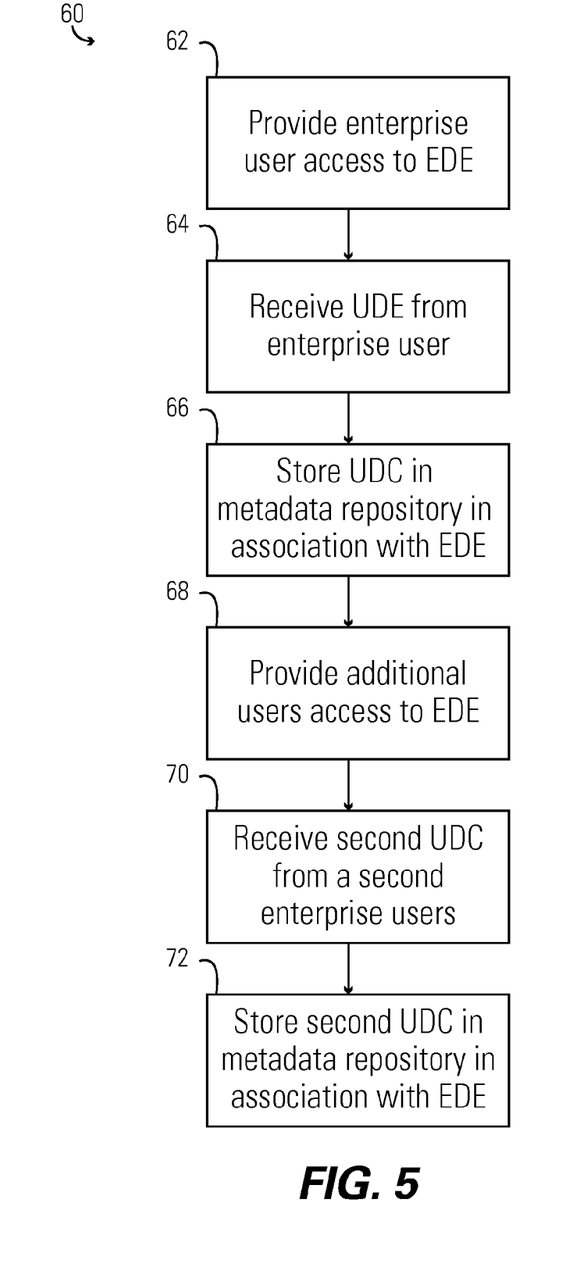
FIG. 5 shows a flow diagram of a process for dynamic categorization of enterprise information in accordance with an embodiment of the invention.

FIG. 5 shows a flow diagram of a process for dynamic categorization of enterprise information in accordance with an embodiment of the invention. In step 62 an enterprise user is provided access to an EDE. The enterprise user creates a UDC which is received by the enterprise information management system, step 64. In step 66, the UDC is stored in a metadata repository, which also creates an association between the UDC and the EDE. Additional users may then be provided access to the EDE, step 68, and a second UDC may be received from the additional users, in step 70. The second UDC is then stored in the metadata repository creating an association between the EDE and the second UDE.

In alternative embodiments of the invention, the flow diagram shown in FIG. 5 may be modified to enable the concurrent classification of EDEs by multiple users. In this case, the metadata repository may need to incorporate some locking/concurrency control.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
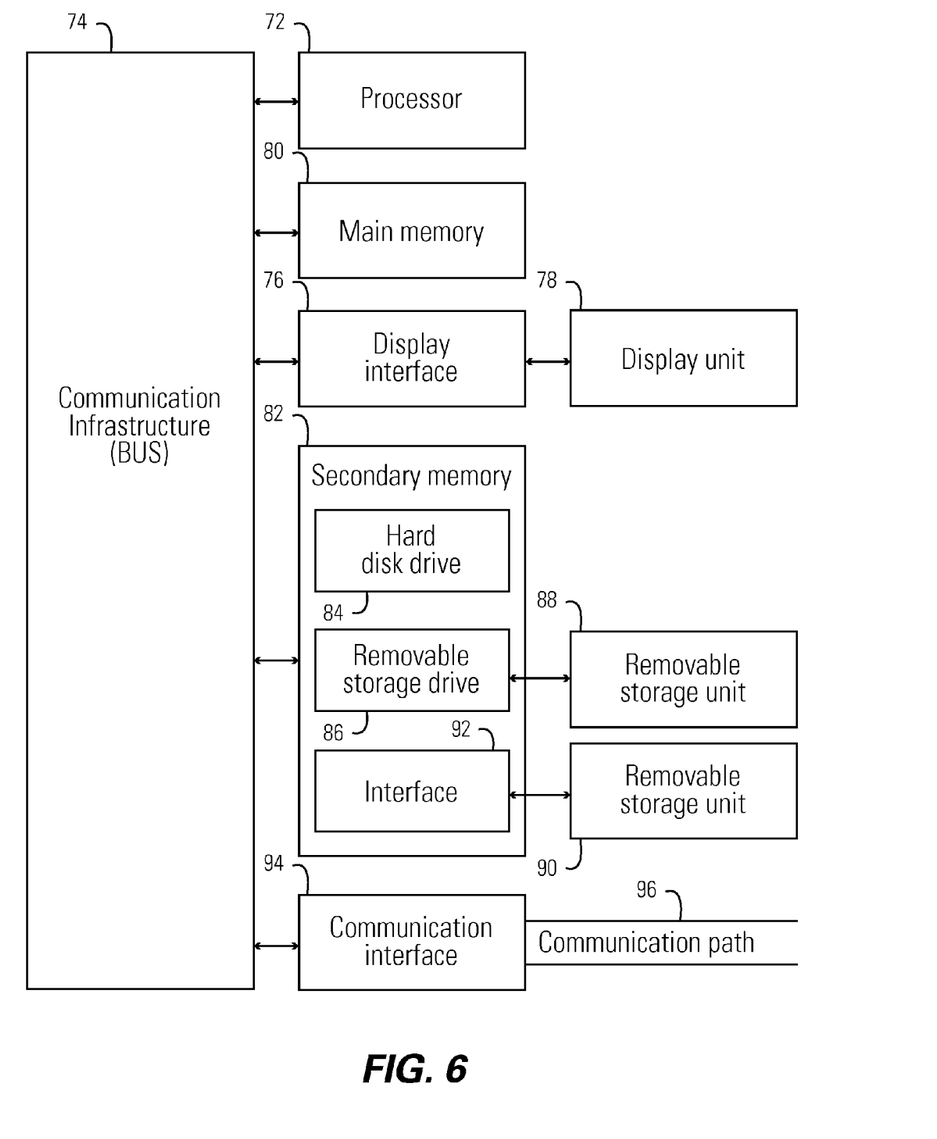
FIG. 6 shows a high level block diagram of an information processing system useful for implementing one embodiment of the present invention.

FIG. 6 is a high level block diagram showing an information processing system useful for implementing one embodiment of the present invention. The computer system includes one or more processors, such as processor 72. The processor 72 is connected to a communication infrastructure 74 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 76 that forwards graphics, text, and other data from the communication infrastructure 74 (or from a frame buffer not shown) for display on a display unit 78. The computer system also includes a main memory 80, preferably random access memory (RAM), and may also include a secondary memory 82. The secondary memory 82 may include, for example, a hard disk drive 84 and/or a removable storage drive 86, representing a floppy disk drive, a magnetic tape drive, an optical disk drive, etc. The removable storage drive 86 reads from and/or writes to a removable storage unit 88 in a manner well known to those having ordinary skill in the art. Removable storage unit 86, represents a floppy disk, a compact disc, magnetic tape, optical disk, etc. which is read by and written to by removable storage drive 86. As will be appreciated, the removable storage unit 88 includes a computer readable medium having stored therein computer software and/or data.

In alternative embodiments, the secondary memory 82 may include other similar means for allowing computer programs or other instructions to be loaded into the computer system. Such means may include, for example, a removable storage unit 90 and an interface 92. Examples of such may include a program cartridge and cartridge interface (such as that found in video game devices), a removable memory chip (such as an EPROM, or PROM) and associated socket, and other removable storage units 90 and interfaces 92 which allow software and data to be transferred from the removable storage unit 90 to the computer system.

The computer system may also include a communications interface 94. Communications interface 94 allows software and data to be transferred between the computer system and external devices. Examples of communications interface 94 may include a modem, a network interface (such as an Ethernet card), a communications port, a PCMCIA slot and card, etc. Software and data transferred via communications interface 94 are in the form of signals which may be, for example, electronic, electromagnetic, optical, or other signals capable of being received by communications interface 94. These signals are provided to communications interface 94 via a communications path (i.e., channel) 96. This channel 96 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 80 and secondary memory 82, removable storage drive 86, a hard disk installed in hard disk drive 84, and signals.

Computer programs (also called computer control logic) are stored in main memory 80 and/or secondary memory 82. Computer programs may also be received via communications interface 94. Such computer programs, when executed, enable the computer system to perform the features of the present invention as discussed herein. In particular, the computer programs, when executed, enable the processor 72 to perform the features of the computer system. Accordingly, such computer programs represent controllers of the computer system.

In accordance with the present invention, we have disclosed systems and methods for dynamic categorization of heterogeneous and regulated enterprise information assets. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method, comprising:
    maintaining, in a computational device, an enterprise class business glossary that defines and categorizes business categories and terms in a selected domain for an enterprise;
    associating a plurality of predefined categories derived from the enterprise class business glossary with an enterprise data entity;
    subsequent to associating the plurality of predefined categories with the enterprise data entity, tagging via one or more words, by one or more users, the enterprise data entity to associate a user defined category to the enterprise data entity; and
    in response to a removal of an association between the enterprise data entity and the user defined category via an action performed by a user, tracing back the action and restoring the association between the enterprise data entity and the user defined category, the method further comprising:
    presenting, via a graphical user interface, to a selected user, a list of tables that are catalogued in a metadata repository in which the enterprise data entity and the user defined category are stored, wherein a table represents a selected enterprise data entity;
    tagging, by the selected user, the table with a title to create a new user defined category, where the new user defined category includes an identification of the selected user;
    storing the new user defined category in the metadata repository and linking to the enterprise data entity to indicate a relationship;
    using the relationship, creating a custom navigation view that includes user defined categories that were previously created by the selected user via tagging operations; and
    navigating, by the selected user, enterprise data entities via the custom navigation view, wherein a tagging process view enables the selected user to select one table from the list of tables and a window for entering user defined categories.

2. The method of claim 1, the method further comprising:
    maintaining a security model for the enterprise data entity in the metadata repository;
    maintaining a user model in the metadata repository, wherein the user model defines a user role for selected users with regard to the enterprise data entity; and
    ensuring access restrictions on the enterprise data entity via the security model and the user model.

3. The method of claim 2, the method further comprising:
    restricting access to the user defined category to selected users of a plurality of users.

4. The method of claim 3, the method further comprising:
    providing locking and concurrency control in the metadata repository to enable concurrent classification of the enterprise data entity by more than one user.

5. The method of claim 1, wherein the user defined category for the enterprise data entity is different from any of the predefined categories associated with the enterprise data entity.

6. The method of claim 1, the method further comprising:
    sharing, by the user, the user defined category for the enterprise data entity with a predefined group of users.

7. The method of claim 1, wherein the user defined category is a first user defined category, the method further comprising:
    generating a second user defined category by the one or more users; and
    generating, in a graphical user interface, a navigation view that includes the first user defined category and the second user defined category; and
    generating a tagging view to enable the one or more users to add a third user defined category.

8. The method of claim 1, the method further comprising:
    tagging, a table via a title in the graphical user interface, to generate at least one user defined category.

9. A system, comprising:
    a memory; and
    a processor coupled to the memory, wherein the processor performs operations, the operations comprising:
    maintaining an enterprise class business glossary that defines and categorizes business categories and terms in a selected domain for an enterprise;
    associating a plurality of predefined categories derived from the enterprise class business glossary with an enterprise data entity;
    subsequent to associating the plurality of predefined categories with the enterprise data entity, tagging via one or more words, by one or more users, the enterprise data entity to associate a user defined category to the enterprise data entity; and
    in response to a removal of an association between the enterprise data entity and the user defined category via an action performed by a user, tracing back the action and restoring the association between the enterprise data entity and the user defined category, the operations further comprising:
    presenting, via a graphical user interface, to a selected user, a list of tables that are catalogued in a metadata repository in which the enterprise data entity and the user defined category are stored, wherein a table represents a selected enterprise data entity:
    tagging, by the selected user, the table with a title to create a new user defined category, where the new user defined category includes an identification of the selected user;
    storing the new user defined category in the metadata repository and linking to the enterprise data entity to indicate a relationship;
    using the relationship, creating a custom navigation view that includes user defined categories that were previously created by the selected user via tagging operations; and
    navigating, by the selected user, enterprise data entities via the custom navigation view, wherein a tagging process view enables the selected user to select one table from the list of tables and a window for entering user defined categories.

10. The system of claim 9, the operations further comprising:
    maintaining a security model for the enterprise data entity in the metadata repository;
    maintaining a user model in the metadata repository, wherein the user model defines a user role for selected users with regard to the enterprise data entity; and
    ensuring access restrictions on the enterprise data entity via the security model and the user model.

11. The system of claim 10, the operations further comprising:
    restricting access to the user defined category to selected users of a plurality of users.

12. The system of claim 11, the operations further comprising:
    providing locking and concurrency control in the metadata repository to enable concurrent classification of the enterprise data entity by more than one user.

13. The system of claim 9, wherein the user defined category for the enterprise data entity is different from any of the predefined categories associated with the enterprise data entity.

14. The system of claim 9, the operations further comprising:
    sharing, by the user, the user defined category for the enterprise data entity with a predefined group of users.

15. The system of claim 9, wherein the user defined category is a first user defined category, the operations further comprising:
    generating a second user defined category by the one or more users; and
    generating, in a graphical user interface, a navigation view that includes the first user defined category and the second user defined category; and
    generating a tagging view to enable the one or more users to add a third user defined category.

16. The system of claim 15, the operations further comprising:
    tagging, a table via a title in the graphical user interface, to generate at least one user defined category.

17. A computer program product comprising a non-transitory computer usable medium having a computer readable program, wherein the computer readable program when executed on a computational device causes the computational device to perform operations, the operations comprising:
    maintaining, in a computational device, an enterprise class business glossary that defines and categorizes business categories and terms in a selected domain for an enterprise;
    associating a plurality of predefined categories derived from the enterprise class business glossary with an enterprise data entity;
    subsequent to associating the plurality of predefined categories with the enterprise data entity, tagging via one or more words, by one or more users, the enterprise data entity to associate a user defined category to the enterprise data entity; and
    in response to a removal of an association between the enterprise data entity and the user defined category via an action performed by a user, tracing back the action and restoring the association between the enterprise data entity and the user defined category, the operations further comprising:
        presenting, via a graphical user interface, to a selected user, a list of tables that are catalogued in a metadata repository in which the enterprise data entity and the user defined category are stored, wherein a table represents a selected enterprise data entity:
        tagging, by the selected user, the table with a title to create a new user defined category, where the new user defined category includes an identification of the selected user;
        storing the new user defined category in the metadata repository and linking to the enterprise data entity to indicate a relationship:
        using the relationship, creating a custom navigation view that includes user defined categories that were previously created by the selected user via tagging operations; and
        navigating, by the selected user, enterprise data entities via the custom navigation view, wherein a tagging process view enables the selected user to select one table from the list of tables and a window for entering user defined categories.

18. The computer program product of claim 17, the operations further comprising:
    maintaining a security model for the enterprise data entity in the metadata repository;
    maintaining a user model in the metadata repository, wherein the user model defines a user role for selected users with regard to the enterprise data entity; and
    ensuring access restrictions on the enterprise data entity via the security model and the user model.

19. The computer program product of claim 18, the operations further comprising:
    restricting access to the user defined category to selected users of a plurality of users.

20. The computer program product of claim 19, the operations further comprising:
    providing locking and concurrency control in the metadata repository to enable concurrent classification of the enterprise data entity by more than one user.

21. The computer program product of claim 17, wherein the user defined category for the enterprise data entity is different from any of the predefined categories associated with the enterprise data entity.

22. The computer program product of claim 17, the operations further comprising:
    sharing, by the user, the user defined category for the enterprise data entity with a predefined group of users.

23. The computer program product of claim 17, wherein the user defined category is a first user defined category, the operations further comprising:
    generating a second user defined category by the one or more users; and
    generating, in a graphical user interface, a navigation view that includes the first user defined category and the second user defined category; and
    generating a tagging view to enable the one or more users to add a third user defined category.

24. The computer program product of claim 23, the operations further comprising:
    tagging, a table via a title in the graphical user interface, to generate at least one user defined category.

* * * * *